July 4, 1961
D. J. FREIMAN
2,991,111
HANDLE ASSEMBLY
Filed Jan. 26, 1959
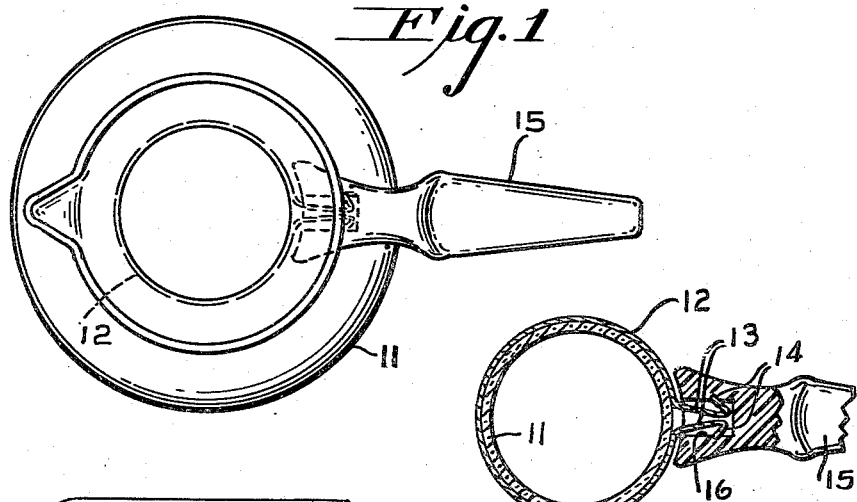
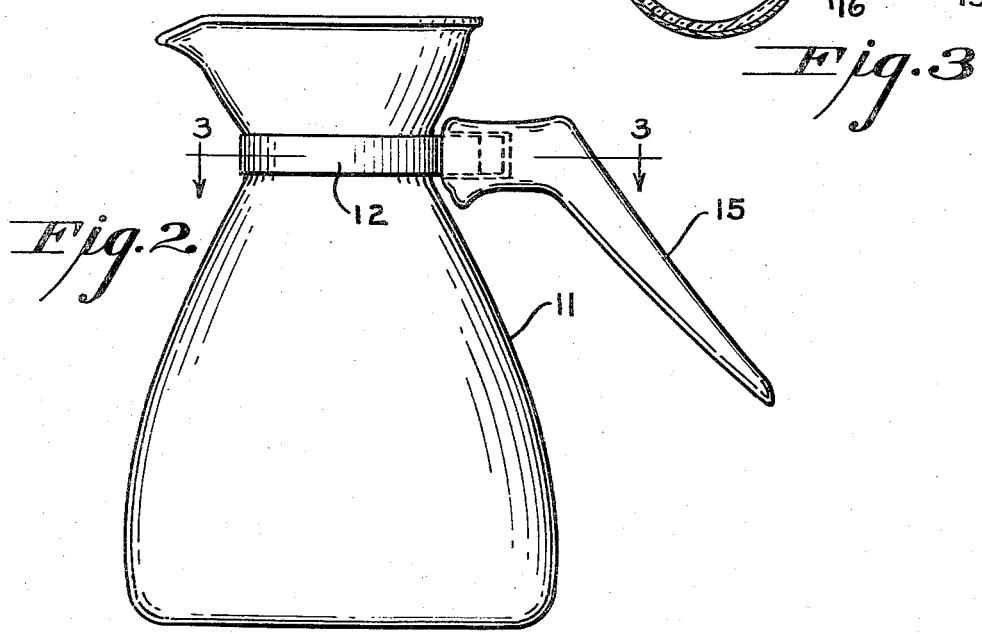
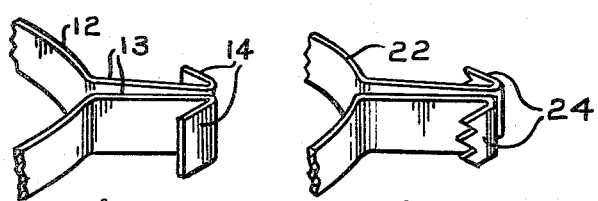
INVENTOR.
DAVID J. FREIMAN
BY Clarence R. Patty Jr.
ATTORNEY

| United States Patent Office | 2,991,111 |
|---|---|
| | Patented July 4, 1961 |

2,991,111
HANDLE ASSEMBLY
David J. Freiman, Corning, N.Y., assignor to Corning Glass Works, Corning, N.Y., a corporation of New York
Filed Jan. 26, 1959, Ser. No. 789,074
3 Claims. (Cl. 294—31.2)

The present invention relates to utensil assemblies most commonly employed for culinary purposes and to a handle and band assembly particularly suitable for use with a lightweight utensil or vessel made of vitreous material such as glass or the like, although equally applicable to vessels made of other materials.

The primary object of the invention is to provide a simple and inexpensive band and handle which are attachable to a vessel simply by clamping the band about a vessel and projecting the band ends into a socket provided in the handle.

According to the invention the handle, which preferably comprises one of the tough rigid, but relatively soft, "so called" unbreakable plastics or the like, has a socket whose entrance faces the vessel neck and into which the generally parallel ends of a band held clamped about it are projected to thereafter maintain the band clamped about the vessel. The band ends are bent outwardly and backwardly upon themselves over 90° and under 180° to form jaws that slidably pass over the socket walls when being projected into the socket. Since the material from which the handle is made is relatively soft, the jaws partly bury themselves thereinto and function as barbs to prevent their withdrawal, thus firmly and permanently holding the parts in their assembled relation.

For a more detailed description of the invention reference will hereinafter be made to the accompanying drawing in which:

FIG. 1 is a top plan view of a handled vessel embodying the invention.

FIG. 2 is a side elevational view of the vessel.

FIG. 3 is a sectional view taken on line 3—3 of FIG. 2.

FIGS. 4 and 5 are perspective views, on an enlarged scale, of fragments of alternative forms of bands that may be employed.

Referring to the drawing in detail, the reference numeral 11 designates a vessel of a form which is ideally suited for use of a band and handle embodying the invention.

The vessel neck is surrounded by a band 12 having end portions 13 arranged in general parallelism when the band is grippingly surrounded, as illustrated, and have their extreme end portions bent outwardly and backwardly to such an extent (approximately 120°) that the jaws 14 formed by them are pointed in divergent directions along lines tangential to opposite sides of the band perimeter.

A handle 15 is provided having a rectangular socket 16 formed therein of a height corresponding to the band width and of an appropriate depth to accommodate the band end portions 13 and their jaws 14 which are forced thereinto.

As an alternative to the use of a band with plain jaws, such as 14, the band may be provided with jaws that are serrated as are the jaws 24 of the band 22 (FIG. 5).

In the assembly of the band 12 and handle 15 to a vessel such as 11, is arranged about the vessel, the band ends 13 held clamped together and simply forced into the handle socket 16. The jaws 14 then spring outwardly and bite into the socket walls; and particularly since the jaws 14 are pointed in divergent directions along lines tangential to opposite sides of the band perimeter, any attempt to separate the band from the handle simply causes the jaws to dig more deeply into the socket bordering walls of the handle to effectively prevent separation of the handle from the band.

What is claimed is:

1. In a handle and band assembly attached to a utensil, a handle of rigid but relatively soft material having a socket therein whose only entrance faces the utensil to which it is attached, a band encircling the utensil having extensions generally parallel to one another and having the extreme end portions bent outwardly and backwardly upon themselves to form jaws confined within said socket and partly buried in socket wall portions of said handle.

2. In a handle mount for glassware or the like, a split band having generally parallel end portions extending radially outward therefrom, the free ends of said end portions being bent outwardly and backwardly upon themselves over 90° and under 180° to form jaws, a handle having a socket with an opening of the height of said band width, of a width to accommodate said band end portions when clamped together and their jaws, and of a depth to accommodate said band end portions and their jaws, said handle being composed of a material into which said jaws partly bury themselves and prevent withdrawal of said band end portions from said socket.

3. In combination with a circular vessel, an encircling band having free ends arranged in general parallelism and with their extreme ends bent outwardly back upon themselves into jaws pointing outwardly from one another in directions of intersecting lines tangential to the perimeter of the band, and a handle having a socket therein facing the vessel and band and occupied by said jaws and the band ends, said jaws being partly buried in oppositely disposed socket walls of said handle.

References Cited in the file of this patent

UNITED STATES PATENTS

| 2,292,310 | Wilkins | Aug. 4, 1942 |
| 2,428,942 | Poglein | Oct. 14, 1947 |